(12) United States Patent  (10) Patent No.: US 8,297,700 B2
Zahar  (45) Date of Patent: Oct. 30, 2012

(54) AUTOMOTIVE VEHICLE SAFETY SEAT

(76) Inventor: Chirine M Zahar, Millbrae, CA (US)

( * ) Notice: Subject to any disclaimer, the term of this patent is extended or adjusted under 35 U.S.C. 154(b) by 0 days.

(21) Appl. No.: 13/182,343

(22) Filed: Jul. 13, 2011

(65) Prior Publication Data

US 2011/0266848 A1  Nov. 3, 2011

Related U.S. Application Data

(62) Division of application No. 11/782,567, filed on Jul. 24, 2007, now Pat. No. 7,984,946.

(51) Int. Cl.
*A47D 1/10* (2006.01)
*B60N 2/26* (2006.01)
*B60N 2/28* (2006.01)

(52) U.S. Cl. .................................................. 297/256.12
(58) Field of Classification Search .............. 297/256.12
See application file for complete search history.

(56) References Cited

U.S. PATENT DOCUMENTS

| | | | |
|---|---|---|---|
| 1,903,267 A | 3/1933 | Roberts | |
| 2,266,200 A | 12/1941 | Hedley | |
| 2,822,858 A | 2/1958 | Mussler | |
| 3,066,979 A | 12/1962 | Pitts et al. | |
| 4,971,392 A | 11/1990 | Young | |
| 5,183,312 A | 2/1993 | Nania | |
| 5,474,353 A | 12/1995 | Koester et al. | |
| 6,027,170 A | 2/2000 | Benz et al. | |
| 6,158,807 A | 12/2000 | Hampton | |
| 6,199,949 B1 | 3/2001 | DaSilva | |
| 6,241,314 B1 | 6/2001 | Pufall | |
| 6,283,545 B1 * | 9/2001 | Ernst | 297/256.12 X |
| 6,572,189 B1 | 6/2003 | Blaymore | |
| 6,793,283 B1 * | 9/2004 | Sipos | 297/256.12 |
| 6,938,954 B1 | 9/2005 | Hendren et al. | |
| 7,357,451 B2 | 4/2008 | Bendure et al. | |
| 7,434,863 B2 | 10/2008 | Hamazaki et al. | |
| 7,438,339 B2 | 10/2008 | Abraham | |
| 7,472,958 B2 | 1/2009 | Sano et al. | |
| 7,648,186 B2 | 1/2010 | Ukai et al. | |
| 7,753,444 B2 | 7/2010 | Vallentin | |
| 7,984,946 B2 * | 7/2011 | Zahar | 297/256.12 |
| 2005/0253431 A1 | 11/2005 | Hei et al. | |

FOREIGN PATENT DOCUMENTS

WO  WO 2005/112701 A2  1/2005
WO  WO 2005108150 A1  11/2005

OTHER PUBLICATIONS

Orbit Baby, Orbit Baby Website Information, earliest copyright 2005, accessed on Jul. 23, 2007, available at http://www.orbitbaby.com and related links, Newark, CA, U.S.A.
Orbit Baby, Orbit Infant System Infant Car Seat/Base Manual, Rev 3.0 Feb. 2007, accessed on Jul. 23, 2007, p. 1-92, Newark, CA, U.S.A., available at http://www.orbitbaby.com/support/Orbit%20 Manual_ICSBase_R03.pdf.
Orbit Baby, Orbit Base Manual, Rev 3.0 Feb. 2007, accessed on Jul. 23, 2007, p. 1-44, Newark, CA, U.S.A., available at http://www. orbitbaby.com/support/Orbit%20Manual_Base_R02.pdf.

* cited by examiner

*Primary Examiner* — Rodney B White

(57) ABSTRACT

Improved child and infant safety seats for automotive vehicles. In one embodiment, a safety seat apparatus includes a base unit that may be secured to a vehicle seat, a coupling unit extendably and retractably coupled to the base unit, and a safety seat pivotally and removably coupled to the coupling unit.

17 Claims, 4 Drawing Sheets

AUTOMOTIVE VEHICLE SAFETY SEAT

CROSS-REFERENCE TO RELATED APPLICATIONS

This application is a divisional of and claims priority to U.S. Pat. App. Ser. No. 11/782,567, filed on Jul. 24, 2007 now U.S. Pat. No. 7,984,946 and entitled "Automotive Vehicle Safety Seat", the entire contents of which are incorporated herein by reference.

BACKGROUND

1. Technical Field

The subject matter disclosed herein generally relates to automotive vehicle safety components. More specifically, the subject matter relates to safety seats for infants and children.

2. Information

Automotive vehicles are an important mode of transportation and a source of enjoyment for millions of people around the world. In many instances, young children and infants are passengers in such vehicles. Safety seats may be provided for the children and infants to improve their safety during trips in automotive vehicles. Such safety seats may be designed for the size of the children and infants, may include additional and properly located harnesses, and may be secured in the automobile in a variety of ways. When a safety seat is secured in the vehicle, an adult may have to place the child or infant over the side of the safety seat (as the seat may face the front or back of the vehicle depending on the size and age of the child) by extending into the interior of the vehicle, lifting the child or infant over the side of the seat and rotating the child or infant into place. Such movements may be awkward and may cause dangerous mishandling of the child or infant. Further, such movements may cause injury or discomfort to the adult, for example straining the adult's lower back as the child is extended and rotated into place.

BRIEF DESCRIPTION OF THE DRAWINGS

Embodiments are illustrated by way of example and not by way of limitation in the figures of the accompanying drawings, in which like references may indicate similar elements and in which.

DETAILED DESCRIPTION

Figure 1:
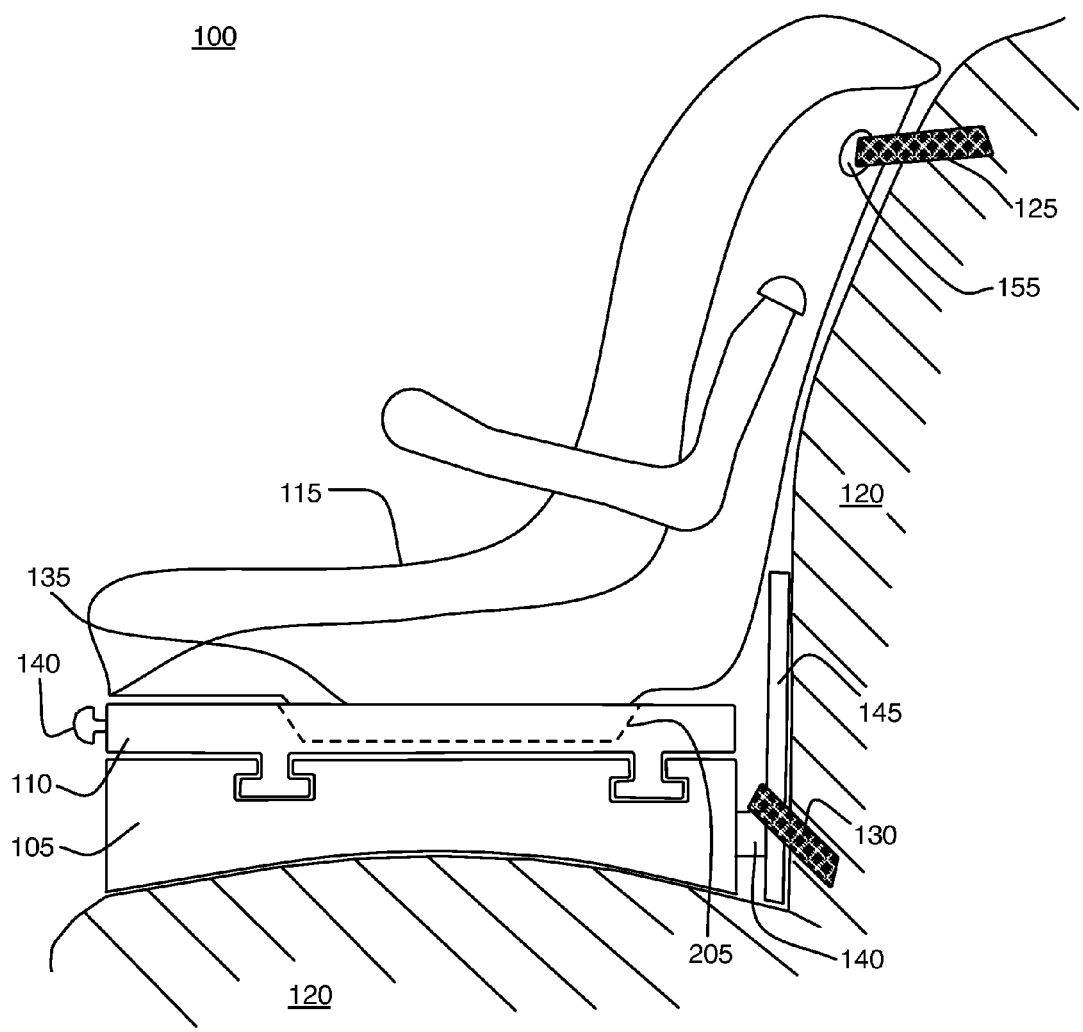
FIG. 1 illustrates a side view of an automotive vehicle safety seat apparatus according to an embodiment.

In the following description, various embodiments will be disclosed. However, it will be apparent to those skilled in the art that the embodiments may be practiced with all or only some of the disclosed subject matter. For purposes of explanation, specific numbers and/or configurations are set forth in order to provide a thorough understanding of the embodiments. However, it will also be apparent to one skilled in the art that the embodiments may be practiced without one or more of the specific details, or with other approaches and/or components. In other instances, well-known structures and/or operations are not shown or described in detail to avoid obscuring the embodiments. Furthermore, it is understood that the embodiments shown in the figures are illustrative representations and are not necessarily drawn to scale.

References throughout this specification to "one embodiment" or "an embodiment" means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner. Various operations may be described as multiple discrete steps in turn, in a manner that is most helpful in understanding the claimed subject matter. However, the order of description should not be construed as to imply that these operations are necessarily order dependent.

In various embodiments of the claimed subject matter, an improved safety seat and associated methods for securing an infant or child into a safety seat are described. In an embodiment, a safety seat apparatus may include a base unit designed and configured to be secured to a seat of an automotive vehicle, a coupling unit designed and configured to be extendably and retractably coupled to the top of the base unit, and a safety seat designed and configured to be pivotally and removably attached to a circular channel in the top surface of the coupling unit. Such a configuration may allow for ease in loading and securing children and infants into a safety seat. For example, the safety seat may be rotated to face a door entry of the vehicle allowing direct access to the front of the safety seat. Further, the safety seat may be extended toward the door entry of the vehicle, thereby shortening the distance the person loading the child must extend to safely place the child in the safety seat. By rotating and extending the safety seat, the described configuration may simplify the handling of the child and decrease the likelihood of mishandling the child or causing injury to the person loading the child. The safety seat may then be retracted back to a position over the base unit and locked into place, and the safety seat may be rotated toward the front or back of the vehicle and locked into place providing a secured safety seat for the child.

In another embodiment, a safety seat apparatus may include a base unit designed and configured to be secured to a seat of an automotive vehicle and a safety seat designed and configured to be pivotally and removably coupled to the base unit such that the safety seat pivots around an axis at or near an edge (or corner) of the base unit. By rotating around such an axis, the safety seat may rotate and extend toward a door entry of the vehicle. By rotating and extending toward a door entry of the vehicle, such a configuration may offer similar benefits, such as, but not limited to, those described above: direct and close access to the front of the seat providing easier handling of the child being loaded into the safety seat. The safety seat may then be rotated into place and securely locked to provide a secured safety seat for the child.

Turning now to FIGS. 1-5, various embodiments will be described. As illustrated in FIG. 1, a safety seat apparatus 100 may include a base unit 105, a coupling unit 110, and a safety seat 115. Base unit 105 may be configured to be secured to a vehicle seat 120, for example by restraint 130. Base unit 105 may include or be attached to restraint brackets 140 and 145 for the purpose of providing a secure location for restraint. Alternatively, restraint 130 may be secured directly to the frame of base unit 105 by an opening (not shown) in the base unit. Base unit 105 may include any suitable material or materials, such as, but not limited to, Aluminum or high density plastics. Further, base unit 105 may include a framing or molded design to aid in properly securing vehicle safety seat apparatus 100 to vehicle seat 120 and properly supporting safety seat 115. Vehicle seat 120 may be the seat of any appropriate automotive vehicle, such as a car, truck, van or sport utility vehicle.

Coupling unit 110, which may include moveable bolt 140 and a substantially circular channel 205, may by extendably and retractably coupled to base unit 105 such that coupling unit 110 and safety seat 115 may be pulled out or pushed in (in the direction into and out of the paper in the illustration of FIG. 1). Coupling unit 110 may be made from a wide range of material or materials, such as, but not limited to, Aluminum or a high density plastic. Coupling unit 110 is described in further detail with reference to FIG. 2 below.

Safety seat 115, which may include or be attached to a substantially circular protrusion 135, may be pivotally and removably coupled to coupling unit 110 such that safety seat 115 may be rotated within circular channel 205 and may be removed from coupling unit 110. Safety seat 115 may include an opening 155 for securing safety seat apparatus 100 to vehicle seat 120 by a restraint 125. Restraints 125 and 130 may be a restraint system as specified by a Lower Anchors and Tethers for Children (LATCH) system, and restraint 125 may be a top-tether in such a system. Safety seat 115 may be made of any suitable material or materials, such as Aluminum or high density plastics. Safety seat 115 may face forward (as illustrated) or backward. Further, safety seat 115 may be designed for an infant (typically about 0-20 pounds), a toddler (typically about 20-40 pounds), or as a convertible infant/toddler seat.

Figure 2:
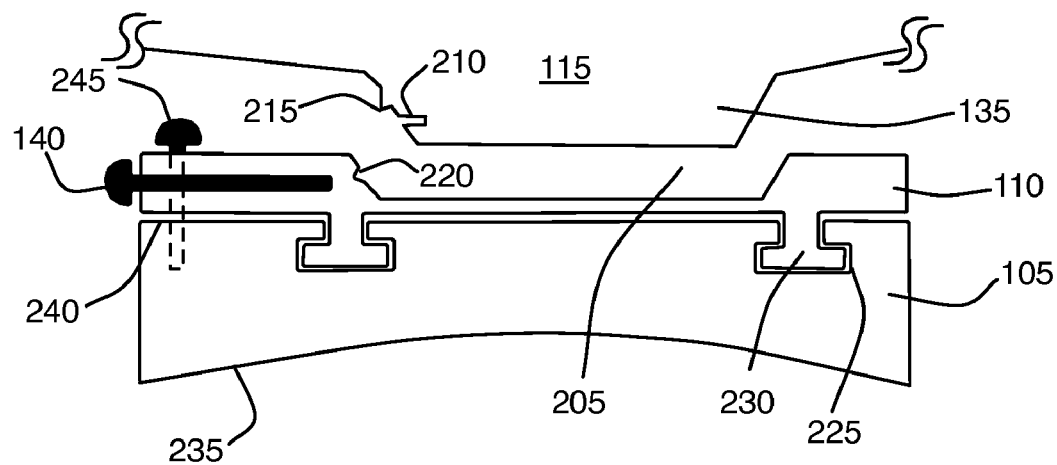
FIG. 2 illustrates a cross-sectional side view of an automotive vehicle safety seat apparatus according to an embodiment.

Referring now to FIG. 2, a magnified and cross-sectional view of safety seat apparatus 100 according to an embodiment is illustrated. As illustrated, base unit 105 may include a substantially linear slot 225 (linear slot 225 extends into and out of the page in FIG. 2). Linear slot 225 may be under a surface 240 of base unit 105 that is opposite a surface 235 that is secured to vehicle seat 120 (as shown in FIG. 1). Further, in the common orientation, linear slot 225 may be said to be under the top surface of base unit 104. Surface 235 may be curved to sit on the vehicle seat or it may be flat. Linear slot 225 may be any slot that can accept and support a rail portion 230 of coupling unit 110. In the illustrated example, linear slot 225 and rail portion 230 are T-shaped, but any suitable shape may be used. Linear slot 225 and rail portion 230 may be materials or coated with materials that slide against one another with relative ease. Further, one or both may be lubricated as needed. As illustrated, two sets of slots and rails may be used, however any number, such as 1, 3, or more may also be used.

As discussed, the slots and rails may allow coupling unit 110 and safety seat 115 to move in and out across the top of base unit 105. The distance coupling unit and safety seat 115 may move out over base unit 105 may be any length. In one example, the distance may be about half of the width of coupling unit 110. Distances of about half the width of coupling unit 110 may be used so that the top heavy safety seat will not tip over when in an extended position. Alternatively, a hinged support (not shown) may be included on the bottom of coupling unit 110 such that the support flips down when coupling unit 110 is extended and may support coupling unit 110 and safety seat 115 when in the extended position. The extension of coupling unit 110 may be restricted by a stop configured in linear slot 225 and rail portion 230 (not shown). Although slots and rails have been described, any extendable and retractable coupling, for example telescoping arms may be used.

Coupling unit 110 may also include a moveable bolt 245. Moveable bolt 245 may be a bolt, pin or rod that may sit into an opening or hole in base unit 105 when coupling unit 110 is in a locked position relative to base unit 105. For example, when in the retracted position, moveable bolt 245 may secure coupling unit 110 and base unit 105. They may be released by lifting moveable bolt 245. Other locking mechanisms, such as spring loaded bolts, threaded bolts, and various latches may also be used to lock coupling unit 110 to base unit 105.

Figure 3:
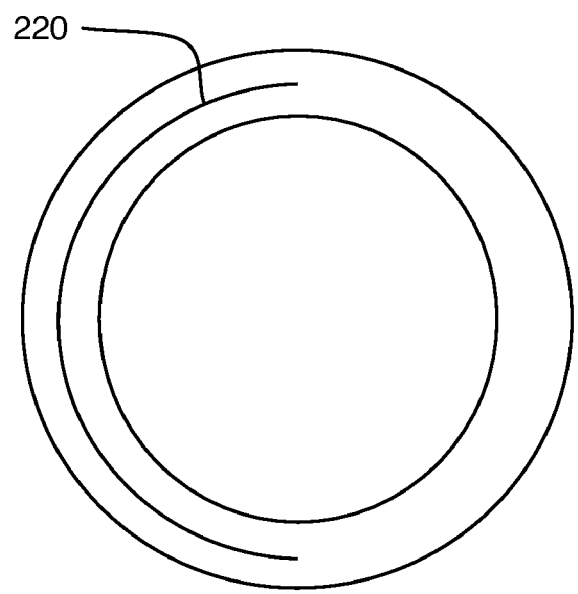
FIG. 3 illustrates a top-down view of a circular channel of a coupling unit for an automotive vehicle safety seat apparatus according to an embodiment.

FIG. 2 illustrates safety seat 115 in an unlocked and raised position for the ease of illustration and explanation. As discussed, coupling unit 110 may include a circular channel 205 (having a circular shape from a top down view as is shown in FIG. 3). Safety seat 115 may have a correspondingly shaped circular protrusion 135 that seats into circular channel 205 when safety seat 115 is set down. Circular channel 205 and circular protrusion 135 are shown in the shape of section of a cone, having sloped sidewalls. A conic section having sloped sidewalls may improve seating the safety seat and ease of rotation, but other shapes may be used, such as a section of a cylinder or a single or multiple rings on the bottom of safety seat 115 with corresponding grooves in coupling unit 110. Further, a channel is shown in coupling unit 110 and a protrusion is shown on safety seat 115, however those components may be switched such that safety seat 115 includes a channel that fits over a protrusion extending out of coupling unit 110.

Circular protrusion 135 may include an opening 210 that may be shaped as a hole, which may accept moveable bolt 140 when in a locked position. Safety seat 115 may be released from the locked position by pulling on moveable bolt 140. Moveable bolt 140 may be a bolt, pin, or rod including a handle that secures safety seat 115. However, other locking mechanisms such as a spring loaded bolt, a threaded bolt, or other latching mechanisms may be used.

In an embodiment, coupling unit 110 may include a notch 220 and circular protrusion 135 may include a tab 215 that is configured to couple with notch 220. Notch 220 may also be referred to as an opening or groove. Notch 220 may extend around a portion of circular channel 205 as is illustrated in FIG. 3. In FIG. 3, as in FIG. 1 and FIG. 2, the left side of the figure may be toward the front of a vehicle and notch 220 may extend from one side entry of the vehicle to the other side entry of the vehicle such that tab 215 (which may be about 0.25 to 1.25 inches in length) may allow safety seat to rotate from one side entry of the vehicle to the other side entry of the vehicle around an angle of about 180 degrees. Tab 215 and notch 220 may allow safety seat 115 to be placed into coupling unit 110 and then to be rotated only to the point where tab 215 meets the end of notch 220, thus providing alignment for loading and unloading a child. A securing mechanism (not shown) such as a moveable bolt or latch may also be provided for securing safety seat 115 when the seat is facing the side entry of a vehicle.

As described, safety seat apparatus 100 may provide a safety seat that may rotate and extend toward a side entry of a vehicle, thereby making it easier and safer (for both the child and adult) to seat and unseat a toddler or infant.

Figure 4:
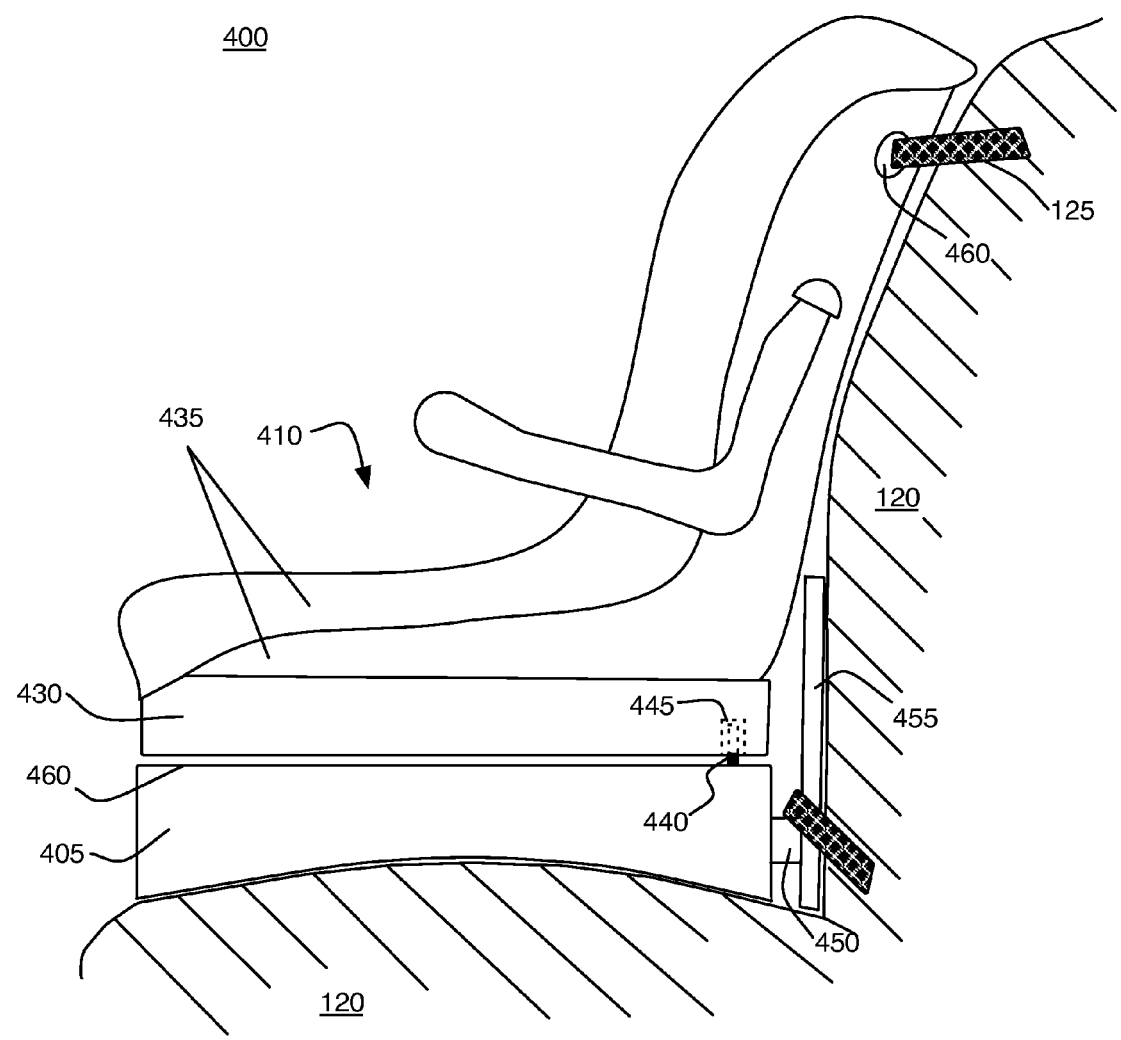
FIG. 4 illustrates a side view of an automotive vehicle safety seat apparatus according to an embodiment.

As illustrated in FIG. 4, in another embodiment, a safety seat apparatus 400 may include a base unit 405 and a safety seat 410 which may include seat portion 435 and may include or be attached to a support block 430. Base unit 405 may be configured to be secured to a vehicle seat 120. Base unit 405 may include or be attached to restraint brackets 450 and 455 which may be configured to be secured by restraint 425. Alternatively, base unit 405 may be configured to be secured directly to vehicle seat 120 by an opening (not shown) in base unit 405. Base unit 405 may include any suitable material or materials, such as, but not limited to, Aluminum or high density plastics. Base unit 405 may be designed to have a frame or molded structure that promotes securing base unit 405 to vehicle seat 120 and support of safety seat 410. Safety seat 410 may include an opening 460 for securing safety seat apparatus 400 to vehicle seat 120 by restraint 125. As discussed above with reference to FIG. 1, restraints 125 and 130 may be based upon the LATCH system. Safety seat 410 may face forward (as illustrated) or backward. Further, safety seat 410 may be designed for an infant (typically about 0-20 pounds), a toddler (typically about 20-40 pounds), or as a convertible infant/toddler seat.

Support block 430 may be a portion of safety seat 410 or safety seat 410 may be attached to support block 430. In any event, support block 430 may be pivotally and removably coupled to base unit 405 such that support block 430 may rotate about an axis that is at an edge or corner of support block 405, as is further described with respect to FIG. 5A and FIG. 5B. Base unit 405 may include a post 440 which may be anchored (either securely or removably) into base unit 405 and may extend above a surface 460 of base unit 405.

Figure 5A:
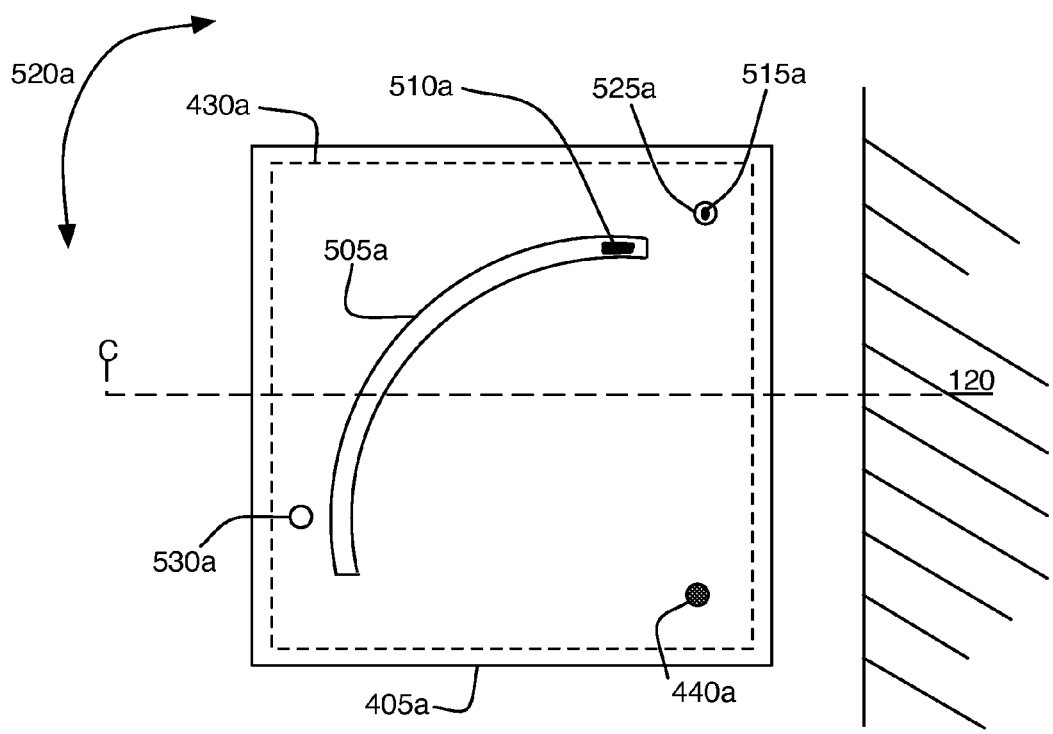
FIG. 5A illustrates a top-down view of a base unit of an automotive vehicle safety seat apparatus according to an embodiment.

As illustrated in a top-down perspective in FIG. 5A, in an embodiment a base unit 405a may be approximately rectangular in shape and a post 440a may be located proximate to a corner of base unit 405a that is adjacent to the back support of vehicle seat 120 and away from the centerline (labeled CL in the illustration) of base unit 405a. Base unit 405a may include a substantially curved groove 505a which may couple to a tab 510a provided on the bottom of support block 430a (the support block is illustrated by the hatched line). A moveable bolt 515a may also be provided on support block 430a to release and secure the safety seat. When released, the safety seat may pivot around post 440a (in the direction of arrow 520a) such that tab 510a slides in groove 505a until the tab reaches the end of the groove and the travel is stopped. The safety seat may then be in an extended and accessible position for seating and unseating an infant or child. The safety seat may be locked into the extended position by fitting moveable bolt 515a into opening 530a. The safety seat may be released and pivoted back to the original position and moveable bolt 515a may be fitted into opening 525a.

Figure 5B:
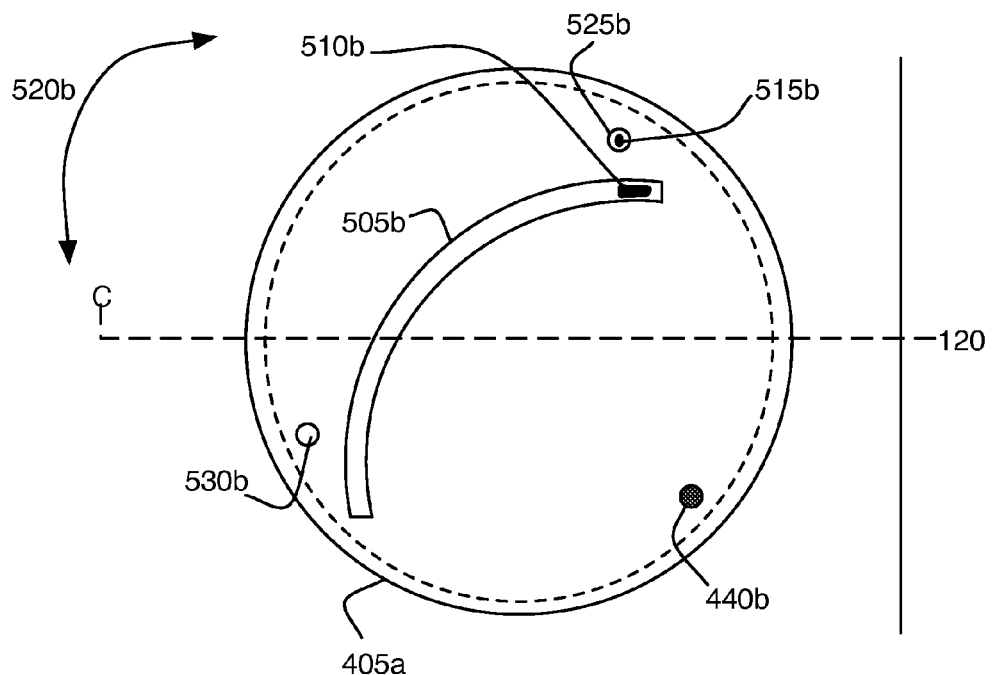
FIG. 5B illustrates a top-down view of a base unit of an automotive vehicle safety seat apparatus according to an embodiment.

As illustrated in a top-down perspective in FIG. 5B, in another embodiment, a base unit 405b may be oval or round in shape. In general, the base unit and support block may have any shape such that they may function to rotate and extend the safety seat toward a vehicle door opening. As illustrated in FIG. 5B, a tab 510b on the bottom of support block 430b may slide in a substantially curved groove 505b as the safety pivots around post 440b (in the direction of arrow 520b) until the travel is stopped when the tab reaches the end of the groove. The safety seat may be locked into position facing the front of the vehicle or toward the side of the vehicle by setting moveable bolt 515b into opening 525b or opening 530b, respectively.

As mentioned previously, post 440 may be removably anchored to base unit 405. In an embodiment, two posts may be provided, with one on each side of the centerline of the base unit. Either of the two posts may then be removed and the safety seat may be rotated in either direction depending on which removable post is removed. The child safety may then be installed on either side of a vehicle or in the center seat of a vehicle with easy access from either side door entry of the vehicle.

As described, safety seat apparatus 400 may provide a safety seat that may rotate around an off-center axis and thereby extend toward a side entry of a vehicle. Such an apparatus may make it easier and safer (for both the child and adult) to seat and unseat a toddler or infant.

While there has been illustrated and/or described what are presently considered to be example embodiments of claimed subject matter, it will be understood by those skilled in the art that various other modifications may be made, and/or equivalents may be substituted, without departing from the true scope of claimed subject matter. Additionally, many modifications may be made to adapt a particular situation to the teachings of claimed subject matter without departing from subject matter that is claimed. Therefore, it is intended that the patent not be limited to the particular embodiments disclosed, but that it covers all embodiments falling within the scope of the appended claims.

What is claimed is:

1. A vehicle safety seat apparatus comprising:
a base unit configured to be secured to a vehicle seat;
a coupling unit, the coupling unit configured to be extendably and retractably coupled to the base unit, wherein the coupling unit includes a substantially circular and open channel on its top surface, the substantially circular and open channel having a shape of a conic section having sloped sidewalls; and
a safety seat including a substantially circular protrusion that is configured to substantially fit and rotate within the substantially circular and open circular channel of the coupling unit, the safety seat configured to be pivotally and removably coupled to the coupling unit via the substantially circular and open channel of the coupling unit being configured to removably receive the substantially circular protrusion of the safety seat, wherein extension of the coupling unit positions the safety seat toward a door entry of a vehicle.

2. The vehicle safety seat apparatus of claim 1, wherein the base unit comprises a substantially linear slot configured to receive a rail portion of the coupling unit.

3. The vehicle safety seat apparatus of claim 2, wherein the substantially linear slot comprises a T-shaped slot and the rail portion of the coupling unit comprises a T-shaped rail portion.

4. The vehicle safety seat apparatus of claim 3, wherein the substantially circular protrusion comprises an opening and the coupling unit comprises a moveable bolt configured to secure the safety seat by extending into the opening when the safety seat is in a locked position.

5. The vehicle safety seat apparatus of claim 1, wherein the safety seat comprises a safety seat designed for an infant.

6. The vehicle safety seat apparatus of claim 1, wherein the vehicle safety seat apparatus is configured to attach to a vehicle by a Lower Anchors and Tethers for Children (LATCH) system.

7. The vehicle safety seat apparatus of claim 1, wherein the substantially circular protrusion comprises a tab that couples with a notch in the coupling unit and along the circular channel, wherein the notch extends around about 180 degrees of the circular channel.

8. A vehicle safety seat apparatus comprising:
a base unit configured to be secured to a vehicle seat, wherein the base unit includes a substantially linear slot on a surface opposite the vehicle seat;
a coupling unit, the coupling unit configured to be extendably and retractably coupled to the base unit, wherein the coupling unit includes a rail portion coupled with the substantially linear slot, a substantially circular and open channel, and a moveable bolt; and a safety seat including a substantially circular protrusion that is configured to rotate within the substantially circular and open circular channel of the coupling unit, the safety seat configured to be pivotally and removably coupled to the coupling unit via the substantially circular and open channel of the coupling unit being configured to removably receive the substantially circular protrusion of the safety seat, wherein the safety seat includes an opening configured to accept the moveable bolt when the safety seat is in a locked position, wherein extension of the coupling unit positions the safety seat toward a door entry of a vehicle.

9. The vehicle safety seat apparatus of claim 8, wherein the linear slot comprises a T-shaped slot and the rail portion of the coupling unit comprises a T-shaped rail portion.

10. The vehicle safety seat apparatus of claim 8, wherein the substantially circular protrusion comprises a tab that couples with a notch in the coupling unit and along the circular channel, and wherein the notch extends around about 180 degrees of the substantially circular channel.

11. The vehicle safety seat apparatus of claim 8, wherein the safety seat comprises a safety seat designed for an infant.

12. The vehicle safety seat apparatus of claim 8, wherein the vehicle safety seat apparatus is configured to attach to a vehicle by a Lower Anchors and Tethers for Children (LATCH) system.

13. A vehicle safety seat apparatus comprising:
a substantially circular base unit configured to be secured to a vehicle seat;
a safety seat including a support block below a seat portion of the safety seat, wherein the support block is configured to be pivotally and removably coupled to the base unit, and wherein the support block includes a tab configured to couple with the substantially curved groove when the safety seat is pivoted around a vertical axis;

a first post configured to be removably anchored to a first corner of the substantially circular base unit, wherein, when the first post is anchored to the first corner of the substantially rectangular base unit, the safety seat and the base unit are configured such that the safety seat may pivot around a first vertical axis at the first corner of the substantially circular base unit; and a second post configured to be removably anchored to a second corner of the substantially circular base unit, wherein, when the second post is anchored to the second corner of the substantially rectangular base unit, the safety seat and the base unit are configured such that the safety seat may pivot around a second vertical axis at the second corner of the substantially circular base unit.

14. The vehicle safety seat of claim 13, wherein the support block comprises a moveable bolt and the base unit comprises a hole configured to receive the bolt when the safety seat is in a locked position.

15. The vehicle safety seat apparatus of claim 13, wherein the safety seat comprises a safety seat for a toddler.

16. The vehicle safety seat apparatus of claim 13, wherein the vehicle safety seat apparatus is configured to attach to a vehicle by a Lower Anchors and Tethers for Children (LATCH) system.

17. The vehicle safety seat apparatus of claim 13, wherein the vehicle safety seat apparatus is configured to rotate and extend toward a door entry of a vehicle when pivoted around the vertical axis.

* * * * *